July 24, 1951 W. MARTIN 2,561,444
WHEELED OUTRIGGER FOR TRACTORS
Filed Dec. 14, 1949
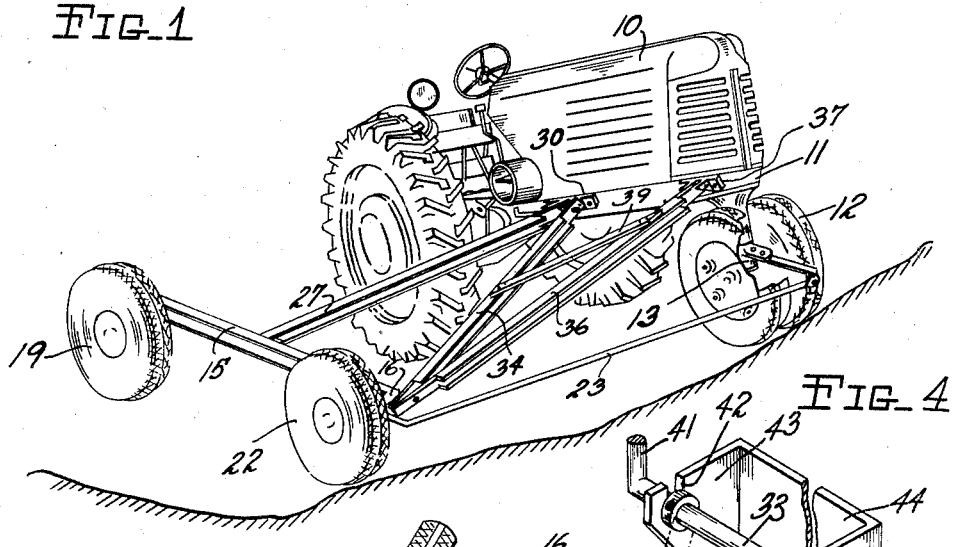
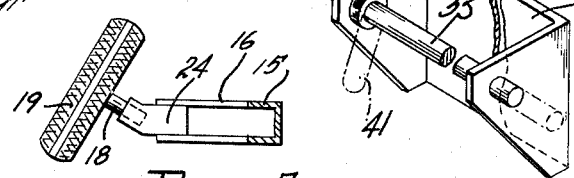
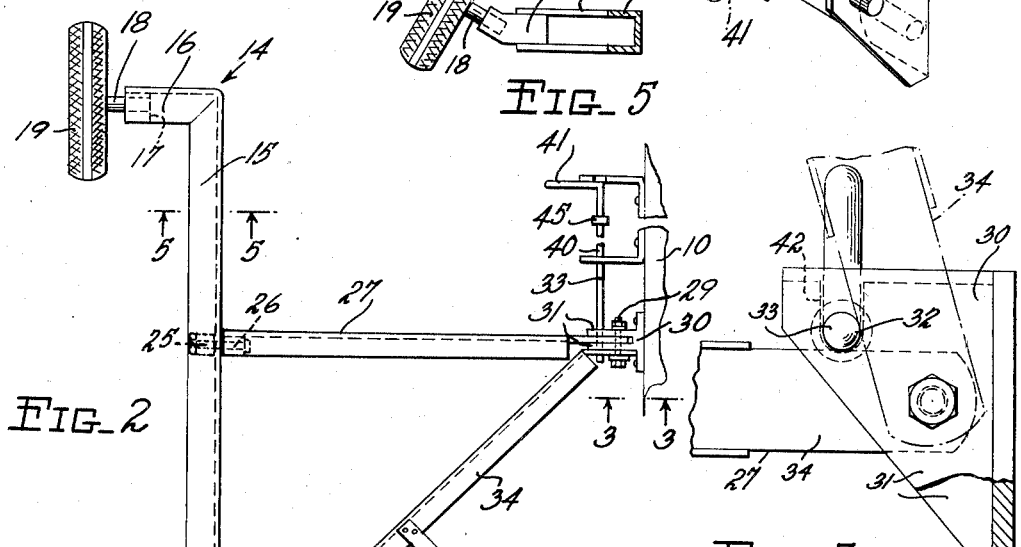
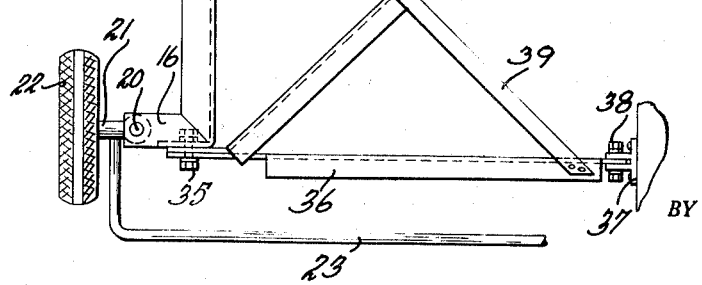
INVENTOR.
WILLIAM MARTIN
BY
ATTORNEY Patented July 24, 1951

2,561,444

UNITED STATES PATENT OFFICE 2,561,444

WHEELED OUTRIGGER FOR TRACTORS

William Martin, Brooklyn, N. Y.

Application December 14, 1949, Serial No. 132,814

4 Claims. (Cl. 280—150)

This invention relates to devices for preventing the accidental upsetting of a vehicle in hill side use.

A particular object of the invention is to provide an outrigger for use in connection with a tractor, as employed in working along a slope, which is flexible in use, can be mounted on either side of the tractor and can be raised when not in use.

A further object of the invention is to provide an outrigger having wheels, one of which is suitably connected to the steering mechanism of the tractor so that it will follow the direction indicated by the front wheels of the tractor.

Further objects include, in the construction of a device of the character referred to, a frame of strong, light structure that can be manipulated by a single operator when the outrigger is to be raised or changed in position from one side of the tractor to the other; to provide holding means for maintaining the outrigger in extended or elevated position; to provide adjustable means for preventing accidental release of the holding means and to provide a structure that is simple and inexpensive and can be readily adopted to tractors or other vehicles where the use thereof is necessary as a safety factor.

With these and other objects in view, the invention comprises certain construction hereinafter described and then particularly pointed out in the claims and a preferred embodiment of my invention is illustrated in the accompanying drawing in which:

Figure 1 is a view in perspective showing the attachment to a tractor of my improved outrigger device in position for use, Figure 2 is a plan view of the outrigger showing the relative location of the parts and the connections therebetween.

Figure 3 is a view in elevation taken substantially at the line 3—3 of Figure 2 showing the mounting means for the device, Figure 4 is a view in perspective of the locking pivot pin used in holding the frame of the device in elevated or lowered position, and Figure 5 is a section on the line 5—5 of Figure 2 showing a modified form of wheel mounting.

Referring to the drawing in detail, 10 indicates a tractor of the usual type employed in pulling farming implements, in this instance along the side of a hill where the slope would cause the tractor to tilt at an angle dangerous to the operator. The tractor comprises the usual chassis portion 11 and steerable front wheels 12 having the usual gear turned knuckle or collar 13 to which, as will be later pointed out, a part of the outrigger is attached.

The outrigger, indicated generally by the numeral 14, consists of a frame 15 disposed parallel to the tractor 10 and having outwardly turned ends or extensions 16. The frame is of channel shape and in the rear end 16 has secured a block 17 providing a mounting for an axle 18 on which wheel 19 is journalled. The forward end likewise carries a pin 20 on which is pivoted an axle 21 for mounting the front wheel 22. The axle 21 has secured thereto in any suitable manner a steering bar 23 which is substantially U-shaped and has a pin and slot connection with an extended portion of the steering collar 13 that turns with the front wheels of the tractor. When the latter are turned, the front wheel of the outrigger is accordingly turned so that the latter follows the direction taken by the tractor. While the wheels 19 and 22 of the outrigger are shown in vertical position relatively to the frame in Figure 2, they may be disposed obliquely an amount that will present the best thrust resisting angle to overturning force exerted by the tractor as illustrated in Figure 5, in which the axle supporting block 24 may protrude from the frame extensions at a suitable angle.

The frame 15 carries a block 25 in which a bolt 26 is secured to connect the outer end of an arm 27 to the frame, the inner end of said arm being pivoted on a bolt 29 mounted in a bracket 30 fixed to the chassis of the tractor. The bracket is shaped to present wings 31 having aligned openings 32 through which a retractable pin 33 passes to overlie or underlie the inner ends of the arm 27 and a strut 34. The latter is pivoted on said bolt 29 and connected, through a bolt 35, to the front end of the frame 15. The bolt 35 also mounts the outer end of an arm 36 pivoted at its inner end to the tractor chassis through the medium of a bracket 37 and bolt 38. The arm and the strut are connected by a brace 39 to provide a light yet rigid frame structure.

The retractable pin 33 is extended rearwardly providing an elongated shank portion 40 and a handle 41, the latter of which, when turned to a vertical position as seen in Figure 3 being arranged to pass through a slot or notch 42 in a keeper plate 43 forming one side of a bracket 44 in which the pin is slidably supported. When the handle is turned down to the outline position shown in Figure 4, the pin is held in position overlying the arm and strut in the bracket. The tractor may have a tilting movement but the latter is resisted at a predetermined angle by the pin in order to prevent overturning of the tractor. The longitudinal position of the pin in its arm release movement can be controlled by the adjustable collar 45 secured thereon.

It will be evident that, by the mounting of the frame as described the outrigger in use will be held against the ground or can be carried in fully raised position to allow the tractor to pass through farm gates and other narrow passageways without the necessity of folding or removing the outrigger. Also the mounting of the frame 14 permits enough play to allow the outrigger to ride over rough ground and furrows without jarring action or bumping that would unduly shake the tractor.

The parts of the outrigger may be made of light strong channel shaped metal to permit easy lifting and removal of the outrigger which latter is facilitated by the minimum of two bolt connections to the brackets on the tractor.

My invention is not to be restricted to the precise details of construction shown since various changes and modifications may be made therein without departing from the scope of the invention or sacrificing the advantages to be derived from its use.

What I claim is:

1. The combination with a tractor or the like having a steerable wheel of an outrigger comprising a frame, brackets on the tractor, a pair of arms for connecting the frame and the tractor through said brackets, one of the arms being disposed at one end of the frame and the other intermediate the ends thereof, means for connecting the ends of the arms to the frame, wheels on each end of said frame, the front wheel being steerable and a steering rod connecting the front wheel of the frame with the steerable wheel of said tractor.

2. The combination with a tractor or the like having a steerable part, of an outrigger comprising a single frame piece of standard structural cross-sectional shape having outwardly turned ends, wheels mounted at said ends including a steerable wheel, a steering bar connecting said steerable part with the steerable wheel, arms connected to the frame piece, brackets attached to the tractor and to which the other ends of said arms are pivoted, said arms being of standard structural cross-sectional shape and means for holding the arms and the frame in lowered and raised positions.

3. In a device of the character set forth in claim 2 in which said arm holding means includes a retractable pin slidably mounted in one of the brackets, means for supporting said pin for passage through holes in said bracket and means in said supporting means for securing the pin in arm holding position.

4. An outrigger for use with a tractor having a chassis and a steerable front wheel comprising an elongated frame arranged in parallel spaced relation to the tractor, wheels on the front and rear ends of said frame the front end wheel being steerable, means for connecting the front wheel of the tractor with the front frame wheel, brackets on the tractor arms on the frame, pivot means for connecting the arms with the brackets whereby the frame can be raised and lowered, one of the brackets having a pin opening therein, a retractable pin slidably mounted in said opening and having a turned handle portion, said pin being adapted to underlie and overlie one of said arms to hold the same in raised and lowered positions respectively, means for supporting said pin for axial movement including a plate having a slot for passage of said pin handle portion to the exterior side of the plate, said plate being adapted to retain the pin in arm holding and release positions, and means on said pin coacting with said plate for limiting the retract position of said pin.

WILLIAM MARTIN.

REFERENCES CITED

The following references are of record in the file of this patent:

UNITED STATES PATENTS

| Number | Name | Date |
|---|---|---|
| 1,138,610 | Hartsough | May 4, 1915 |
| 1,492,487 | Stokes | Apr. 29, 1924 |
| 2,227,423 | Boyd | Jan. 7, 1941 |

FOREIGN PATENTS

| Number | Country | Date |
|---|---|---|
| 527,899 | Germany | June 22, 1931 |